H. D. TAYLOR.
SHORT BASE RANGE FINDER.
APPLICATION FILED MAR. 11, 1911.

1,013,849.

Patented Jan. 2, 1912.
7 SHEETS—SHEET 1.

Witnesses
J. N. Fowler Jr.
R. S. Frogner

Inventor
Harold D. Taylor
By W. P. Thompson
Atty

UNITED STATES PATENT OFFICE.

HAROLD DENNIS TAYLOR, OF BISHOPHILL, YORK, ENGLAND.

SHORT-BASE RANGE-FINDER.

1,013,849.　　　　Specification of Letters Patent.　　Patented Jan. 2, 1912.

Application filed March 11, 1911. Serial No. 613,821.

*To all whom it may concern:*

Be it known that I, HAROLD DENNIS TAYLOR, subject of the King of Great Britain, residing at Bishophill, York, in the county of York, in the Kingdom of England, have invented certain new and useful Improvements in Short-Base Range-Finders, of which the following is a specification.

This invention relates to short-base range-finders, and it is the principal object of the invention to provide a range-finder combining the advantages of binocular and stereoscopic vision.

The advantages obtainable are as follows:—

1st. The gain in illumination to be obtained. It is well known that the physiological effect of superimposing the image seen with the left eye upon the image seen with the right eye is to largely increase, if not to double the apparent brightness of the object viewed, assuming that the two constituent images are of equal brightness.

2nd. The greater sense of relief or solidity which is yielded when both eyes are used. This is the case even independently of any genuine stereoscopic effect, as can be proved by taking two exactly similar photographs printed from the same negative and combining them into one picture in a stereoscope. It will then be found that a much greater sense of reality and relief is obtained.

3rd. The further sense of perspective relief and solidity following from the two views as seen by the right and left eyes respectively being views as seen by the right and left ends of the instruments respectively, whereby a genuine stereoscopic effect is obtained.

The distance between the two human eyes is about ⅓th of a foot and yet the eyes can realize a certain amount of stereoscopic relief upon objects at least 200 yards away, or at a distance 3000 times the separation between the eyes. Similarly, if a range-finder has a base length of 12 ft., or has its two windows through which the distant object is viewed 12 ft. apart, then a genuine stereoscopic effect may be expected on objects as far off as 12 ft.×3000 or 12,000 yards, supposing the right hand view is brought to the right eye and the left hand view to the left eye, while for distances beyond that the 1st and 2nd advantages still hold good.

The type of short base range-finder to which my invention is most easily applied is that described by me in my British patent specification No. 7322 of 1907 and having only one object glass, one half of which receives light from an optical square at one end of the instrument and the other half light from an optical square at the other end of the instrument.

The invention is illustrated in the accompanying drawings, in which,

Fig. 14 is a sectional plan view of the tube of the instrument in the center part thereof. Figs. 16 to 19 are detail views hereinafter referred to.

Figures 1, 2, 3, 4, 4A:
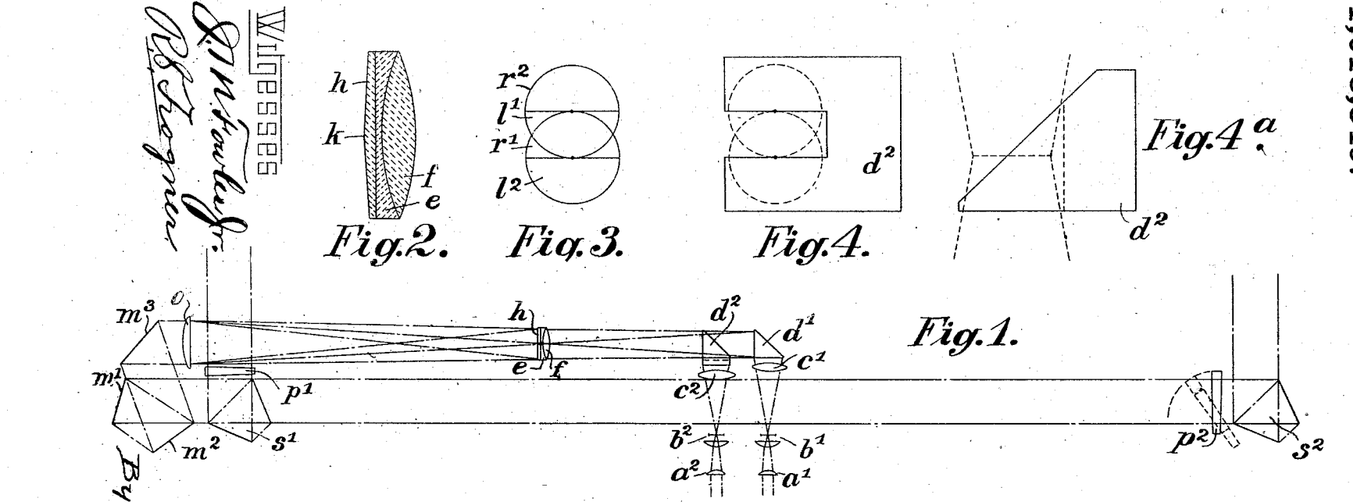
Figure 1 is a diagram illustrating in plan the essential features of an instrument of the known type above referred to, but modified to suit binocular vision.
Fig. 2 shows in vertical section the separating or halving prism combined with one achromatic lens of the erecting eyepiece.
Fig. 3 is a diagram of the pupilary images of the objective as formed by the halving prism.
Figs. 4 and 4ª are two views, elevation and plan respectively, showing a totally reflecting right-angled prism as used in the apparatus.

Referring to the diagram, Fig. 1, if the right eye only is considered and if the parts $a^2$, $b^2$, $c^2$, $d^2$, are supposed to be absent, it is then the same instrument as before described as being already known from British specification No. 7322 of 1907, but with this slight difference, that whereas in my said British specification there was shown an optical square at $d'$ to reflect the light toward the eyepiece, which optical square had two reflecting plane surfaces, in the present instrument it is more convenient to have only one reflecting surface at $d'$ and to remove the other reflecting surface to the left end outside the objective. There are now three plane reflectors $m'$, $m^2$, $m^3$, Fig. 1, outside of the objective and one $d'$ at the elbow, whereas in my earlier instrument there were two outside the objective and two at the elbow $d'$ or four altogether in both cases. An even number is necessary to the correct orientation of the image, and two only are impracticable. At $p'$ is the zero setting achromatic prism and at $p^2$ is the range reading achromatic prism, which swings about an axis parallel to its refracting edge, being actuated by means of a worm sector with attached range scale, as hereinafter described. The extra deviation given by the prism $p^2$ when swung away from its position of minimum deviation, is always made to neutralize the parallax subtended by the base at the distant object, whose range is then indicated on the scale of ranges, when the two images shown in Fig. 5, come into correct coincidence.

Each half of the object glass $o$ (upper and lower) throws its own primary image of distant objects upon the halving or separating prism $h$, the image of the distant object as viewed by the left hand optical square $s'$ being superimposed upon the image of the same distant object as viewed from the right hand optical square $s^2$. These images are formed in the plane containing the sharp ridge $k$ of the separating or halving prism $h$, which is cemented (see Fig. 2) to the first achromatic lens $e\ f$ of the four-lens erecting eye-piece. This lens, if the halving prism were not there, would form an image of the object glass at a place behind it and centrally on the axis, but the effect of the halving prism $h$ with its two sloping plane sides is to cause two pupilary images of the object glass to be formed at $d^2$. The angle of the halving prism is so arranged that these two images of the objective half overlap as shown in Fig. 3, the center of one about coinciding with the circumference of the other. In Fig. 3, the pupilary images or semicircles $r'$, $r^2$, represent light from the right view or image as seen from the right hand end of the instrument, while $l'$, $l^2$, similarly represent light from the left view as seen from the left hand end of the instrument. The outlying halves $r^2$ and $l^2$ in the case of the monocular instrument are screened off by means of two opaque plates of metal, while the overlapping halves $r'$ and $l'$ of the two images of the objectives, fall into the gap between the parallel edges of the two metal plates, and thus all the light from the primary images which passes through the two overlapping half images of the object glass is allowed to pass on through the second or erector lens of the eyepiece $c'$, which throws an erected image into the eyepiece at $b'$, $a'$. The primary images as formed on the halving prism $h$ are of course upside down, and the upper half of the objective in Fig. 1 is supposed to be receiving light from $s'$ at the left hand end of the instrument after three reflections from the upper halves of the reflectors $m'$, $m^2$ and $m^3$. That is the optical square $s'$ is upside down and placed opposite to the upper half of the objective, while the lower half of the objective receives light from $s^2$ at the right hand end of the instrument, which light travels along the lower half of the tube, then underneath $s'$ and thence, after three reflections off the lower halves of $m'$, $m^2$, and $m^3$, into the lower half of the objective.

I have already shown that each half of the objective throws an image onto and all over the halving prism $h$; the pencils forming the lower half of this image are then refracted upward and collected again by the attached lens into the semi-circular pupilary image $l'$ of the upper half objective, which falls between the walls of the slot and is passed, while the image from the bottom half of the objective and right hand end of the instrument also thrown on the lower half of the halving prism, is refracted still more upward into the semi-circular pupilary image $r^2$ of the lower half of the objective. But this light (in the one eye instrument) is stopped, as I before pointed out. The consequence is that the only light coming through the lower half of the halving prism which eventually reaches the eye is that which comes from the upper half of the objective and left end of the instrument, forming the left view $l'$.

Figure 5:
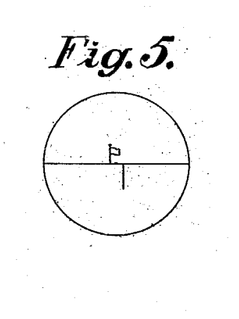
Figs. 5 and 5ª are two views showing the images of a flag staff as seen by the left and right eyes respectively in the instrument.
Figure 5A:
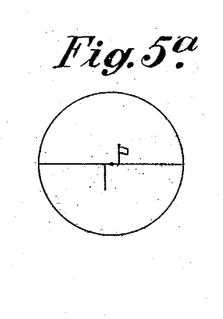

After erection by the second or erector lens $c'$ this light forms the image in the upper half of the field of view, so that the eye sees therein a pure unmixed image of the distant object as seen by the left hand optical square of the instrument, as shown in Fig. 5$^a$, above the halving line. Similarly in the lower half of the field of view the eye sees only the unmixed image of the distant object formed by light from the bottom half of the objective and passing through the upper half of the halving prism $h$, i. e., the semi-circular image $r'$; and this is the right hand view, as seen through the right hand optical square $s^2$. This right view is also shown in Fig. 5$^a$ below the halving line. The left and right images are, therefore, divided from one another by the sharp line of demarcation yielded by the ridge of the halving prism and any parallax subtended by the base at the distant object shows itself as a horizontal separation or break as shown in Fig. 5ª, until the swinging prism $p^2$ which neutralizes and measures the parallax, is operated so as to neutralize the said parallax and so bring the two images into coincidence, when the range of the object is indicated on a suitable scale.

Figure 6:
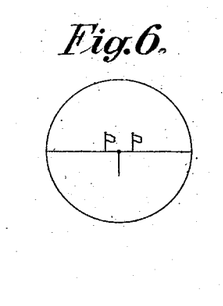
Fig. 6 shows the superposed images as seen by both eyes simultaneously when directing the vision on to the lower half.

Let it now be supposed that the light from the upper half of the objective which falls upon the upper half of the halving prism and the light from the lower half of the objective which falls upon the lower half of the halving prism and which is afterward refracted to form respectively the two semi-circular pupilary images of the objective $l^2$ and $r^2$, is, instead of being screened off and wasted, reflected off at right angles and thus diverted into the left eye of the observer. Then it is evident that if Fig. 5ª is the view as seen by the right eye, wherein the upper image is the view seen by means of the left end of the instrument and the lower image is the view seen by means of the right end of the instrument, then Fig. 5 will represent what is simultaneously presented to the view of the left eye, wherein the upper half of the field is the view seen by means of the right end and the lower half of the field is the view seen by means of the left end of the instrument. Hence while the upper image appears say 10 seconds to the right of the lower image as viewed by the right eye, on the other hand as viewed by the left eye the contrary is the case and the upper appears 10 seconds to the left of the lower image. If then the two eyes are respectively directed upon the lower images so as to cause the two lower images to merge into one, as in the usual act of binocular vision, then it is quite clear that simultaneously two images of the upper image will be seen equally at either side of the lower image, as in Fig. 6, and thus the effect of the parallax as seen by one eye only will be doubled for the two eyes conjointly. Now the lower half of the field is stereoscopic in the true sense, for the right eye gets the view from the right end of the instrument and the left eye the view from the left end, but in the upper half of the field the contrary holds good; the right eye gets the view from the left end and the left eye the view from the right end. Hence in the upper half of the field the views are complementary but not truly stereoscopic. Nevertheless, the effect is more real and solid looking than, and practically twice as luminous as, a monocular view. In the lower half the stereoscopic relief is fully realized. Now the effect when taking the range say of a distant ship, is that if the eyes are concentrated upon a vertical mast or spar in the central part of the lower field, then it stands out with a bold sense of relief, while just above the halving line, the same mast or spar appears more or less doubled (see the flagstaff, Fig. 6) as though nearer to or farther off from the observer than the same spar just below the halving line. But on operating the swinging prism $p^2$ which brings the images into coincidence, the apparent doubling of the upper image decreases until the two images merge into one, and then the mast just above the halving line seems to range itself at the same distance from the observer as the mast just below the halving line, and seems to correctly join on to the same. While for single eye vision the effect of operating the swinging prism is to cause one image to approach and line up with the other from one side only; in the case of binocular vision the effect is that there are seen to be two images in the upper half of the field which approach and line up with the lower image from both sides simultaneously. Or else it is equally feasible, though not so good in effect, for the two eyes to merge the two upper images into one, while the lower images will then appear doubled, when the latter will merge into one and line up with the upper image when the swinging prism is operated to produce coincidence. Any way, so long as there is any part of the parallax unneutralized, it is clear that both upper and lower images cannot simultaneously appear single to binocular vision.

One way, and perhaps the best, of reflecting the light forming the two outlying semi-circular pupilary images of the objective $r^2$ and $l^2$ into the left eyepiece is to take a totally reflecting right-angled prism, $d^2$, shown in Figs. 4 and 4ª, and to cut a rectilinear slot or gap right through it for the free passage of the light forming the two, centrally overlapping semi-circular pupilary images $l'$ and $r'$, which latter light is then reflected off the ordinary right-angled prism $d'$ through the right erector lens $c'$ into the right eyepiece $b'$, $a'$; while the top and bottom parts of the first right-angled prism $d^2$ reflect the other moiety of light i. e.—the outlying semi-circles $l^2$ and $r^2$ through the left erector lens $c^2$ into the left eyepiece $b^2$, $a^2$. The erected image thus formed in front of the left eyepiece is received upon another sort of halving prism, one form of which is shown in vertical section in Fig. 7, so that the image of the first halving prism ridge ($k$, Fig. 2) falls correctly upon the junction line of the two prisms $h^2$, $h^3$, Fig. 7. The object of this is to cause the two separated semi-circular pupilary images $r^2$ and $l^2$ of the half objective to fall together again outside the eyepiece so that they shall simultaneously fall into the pupil of the eye, instead of just above or below it. This second halving prism or lens has thus to make the two images of $r^2$ and $l^2$ formed behind the eye-piece overlap instead of being widely separated.

Figure 8:
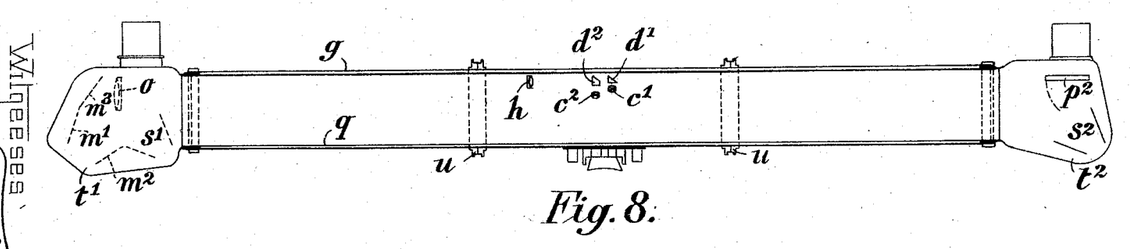
Fig. 8 is a diagram showing the case of the instrument in plan.
Figure 10:
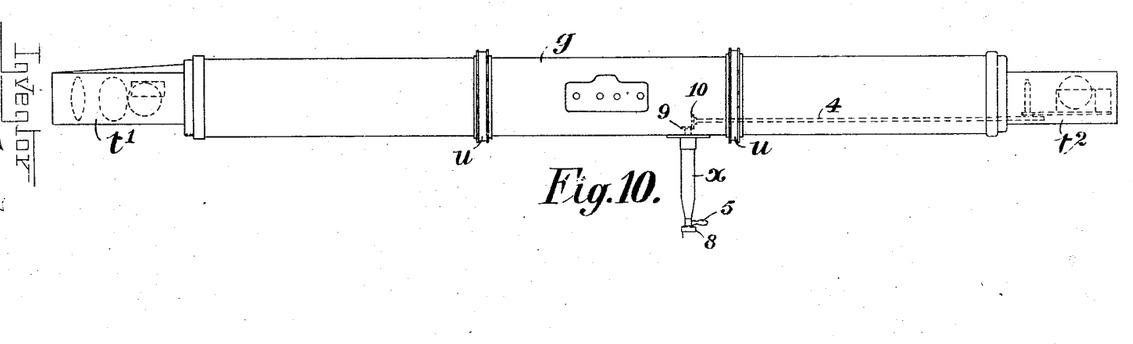
Fig. 10 shows the casing of the instrument in front elevation.

I will now give instructions for enabling any expert in the construction of optical and scientific instruments to make a binocular range-finder in accordance with my invention. I will presume that the object-glass is of 5¼ inches aperture, and that the base length is 12 feet. It thus constitutes an instrument of great light gathering power. The two magnifying powers of eyepieces employed are about 20 and 40 diameters, the former for use when the light or definition is poor. The instrument consists of an inner built-up steel tube $q$ (Figs. 8, 14, 15, etc.); of 11¼" diameter and 12 to 16 wire gage, carrying the two boxes $t'$ and $t^2$ fixed to its ends and lying concentrically within a still larger steel tube $q'$. The inner tube and boxes are connected to the outer tube by means of two pairs of tapered pivots $y$, Figs. 11 and 12, at each end. This arrangement very largely shields the inner tube carrying the boxes from vertical buckling when the sun shines hotly upon the top of the outer tube. Such vertical buckling will cause halving error or inequality in height of the two images from the two ends of the instrument. The air space between the tubes is a great protection against this and moreover the inner tube owing to its pivot connections cannot be buckled vertically by any vertical strain falling upon the outer tube. In order to still further reduce any possible halving errors, it is advisable to cover the inner tube with flannel and then push on over that, and not too tightly, a copper tube (not shown) made of about 1/32nd inch sheet copper. This may be in three lengths for convenience. The outer tube carries flanged bearing rings $u$ Figs. 8 and 10 for the attachment to the mounting.

Figure 11:
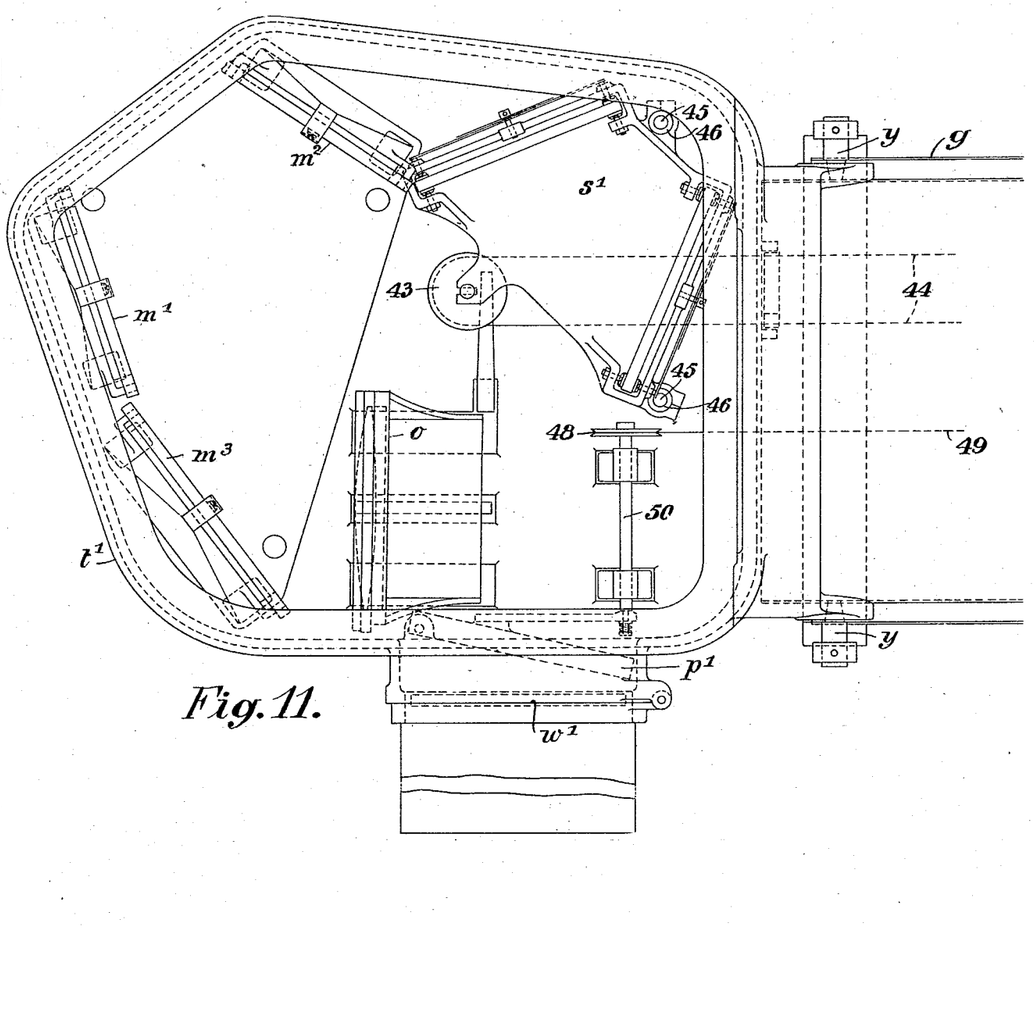
Fig. 11 shows the box ($t'$) at the left hand end of the tube of the instrument, as seen from beneath with the bottom plate or cover removed.

The left hand box $t'$ Fig. 11, preferably made of a good alloy of aluminium, carries the optical square $s'$ which is opposite to the upper half of the object glass. The plan, Fig. 11, shows this box upside down, for convenience, as the solid floor to which the parts are fixed is really at the top while the lid is at the bottom. Thus the optical square $s'$ is fixed to the top or floor and hangs downward so that the bottom edges of its two mirrors are on a level with the center of the object glass $o$.

$m'$, $m^2$, $m^3$, are three silvered circular, plane and parrallel glass mirrors whose centers are about level with the center of the objective. These three mirrors, as well as those of the optical squares, are preferably made in the manner described in the specification of my British Patent No. 13562 of 1907. The achromatic prism $p'$ for setting the zero lies opposite the upper half of the objective, so that the light from the distant object entering the window $w'$ (of plane parallel glass) has to traverse this prism before it reaches the optical square $s'$. After reflection from the optical square it is reflected successively from the upper halves of the three mirrors $m'$, $m^2$, $m^3$, and thence into the upper half of the objective $o$.

Figures 12, 13:
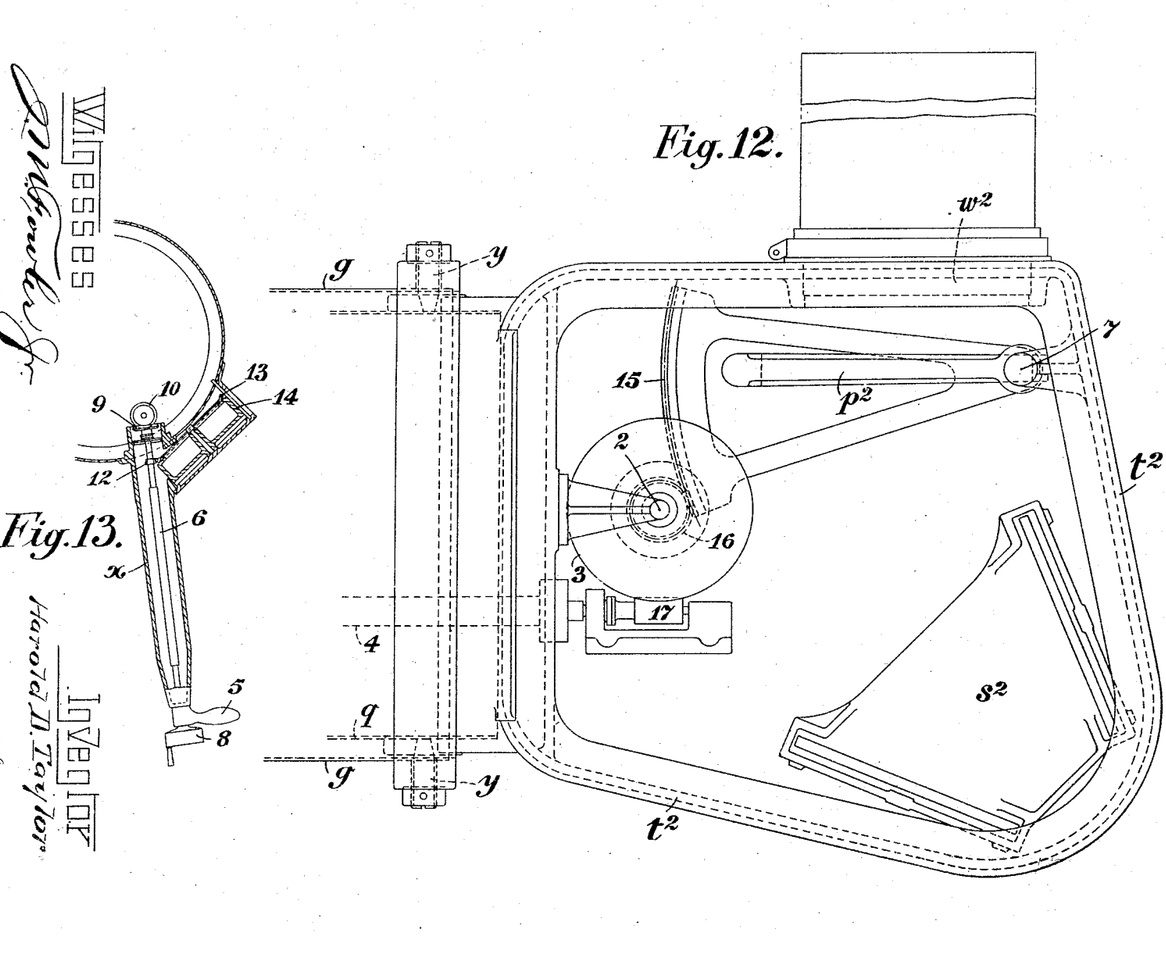
Fig. 12 shows the box ($t^2$) at the right hand end of the instrument, as seen from above with the top cover removed.
Fig. 13 is a detail view on a smaller scale showing the mechanism for actuating the swinging prism in the box ($t^2$) Fig. 12.

The box $t^2$ at the right hand end of the instrument, shown in Fig. 12 as seen from above, contains an optical square $s^2$ fixed to the floor of the box, and at a lower level or opposite to the lower half of the objective $o$.

$p^2$ is the swinging achromatic prism whose angular position, when the images are coincident, indicates the range. This prism is preferably a duplicate of $p'$ except that it should be larger. It is shown as arranged between the window $w^2$ and optical square $s^2$ instead of lying in the path of the light from the square $s^2$ along the tube as in Fig. 1.

The light from the distant object enters the box $t^2$ through the window $w^2$ and traverses the swinging prism and then, after being doubly reflected off the optical square $s^2$, passes along and parallel to the interior of the inner tube $q$, underneath the optical square $s'$ and is then reflected successively from the lower halves of the three mirrors $m'$, $m^2$, $m^3$, and thence into the lower half of the objective $o$. Thus the upper half of the objective receives light from the left hand end and the lower half of the same from the right hand end of the instrument.

Figures 14, 17, 18, 19:
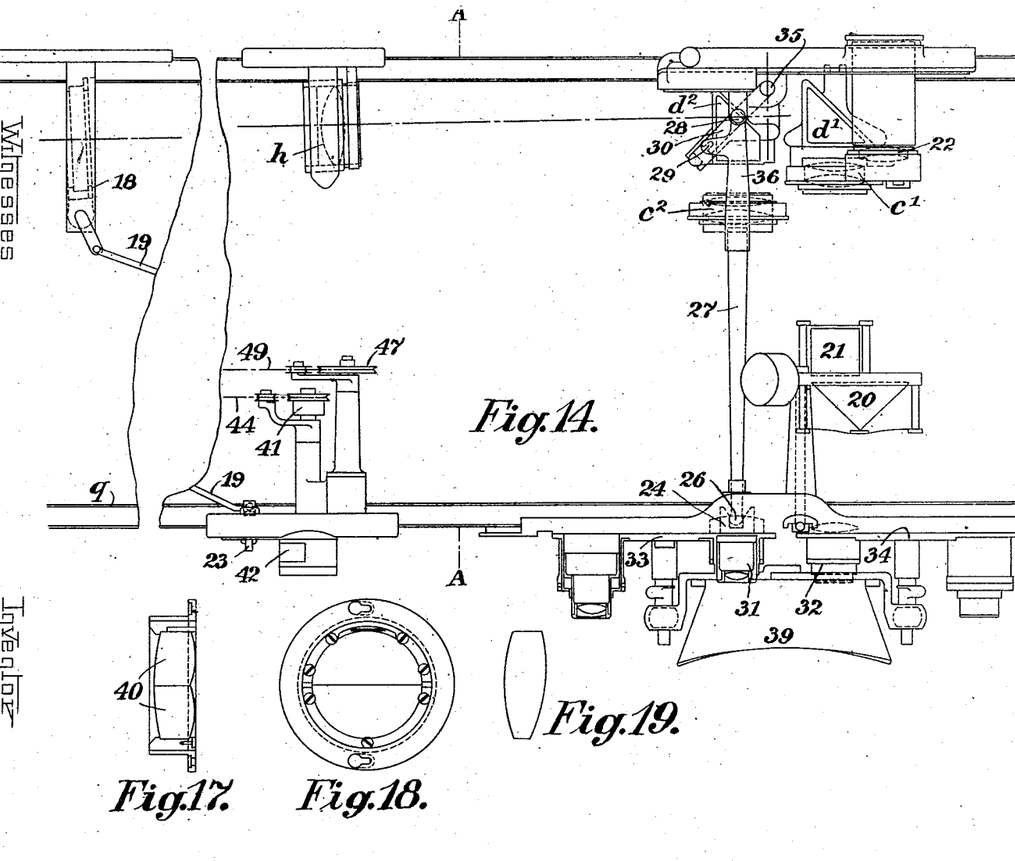

At a distance behind the objective $o$, equal to the focal length is the halving prism $h$ shown in plan in Figs. 1 and 14, and in section in Fig. 2. Each of the two plane slopes of this prism are at an angle equal to $$\frac{A}{4(n-1)F}$$

where A is the clear aperture and F is the focal length of the objective and $n$ is the refractive index of the halving prism. This halving prism is cemented by its plane side to the plano-concave flint lens $e$ of the achromatic first lens ($e$, $f$.) of the 4-lens eyepiece (or halving lens—see Fig. 2) whose office it is to throw an image (rendered overlapping and double by the halving prism) of the objective into the left hand reflecting prism $d^2$ shown in Figs. 1, 4, 4ª, 14 and 16. These two overlapping images of the objective are as it were pupils or common sections of all the pencils of rays diverging from points in the images of distant objects projected by the objective on the upper and lower slopes of the halving prism.

The left hand prism $d^2$ is so slotted through (Figs. 4 and 16) as to allow the overlapping images of the half objective $r'$ and $l'$ (Figs. 3 and 16) to pass through to the right hand reflecting prism $d'$ and thence to the right eyepiece, but the solid upper and lower portions of the left hand prism $d^2$ reflect the uppermost and lowermost images of the half objective into the left eyepiece. Since the distance between different pairs of eyes varies considerably, an adjustment is provided for one of the eyepieces. For this purpose the left hand prism $d^2$ is mounted in the manner shown in Figs. 14, 15 and 16. The left eyepiece 31 is affixed to a metal slide 24, Figs. 14 15, capable of about ¼ inch of motion to right and left of a mean position, operated by a small milled head 25 with a suitable rack and pinion gear. This slide 24 embraces between two jaws the ball or disk termination 26 (Fig. 14) of a lever 27 attached to a frame 36 which is pivoted at 28 and carries a short arm 29 with a downwardly projecting pin in its end. This pin fits into a slot in a second lever 30 just below it, which is part of a frame carrying the slotted prism $d^2$ which frame is pivoted at 35 so that the lever 30 is just double the length of lever 29. This arrangement secures that when the left eyepiece is traversed through an angle of say 2 degrees as subtended at 28 then the prism rotates through half the said angle or 1 degree, and thus the light is always reflected straight toward the left eyepiece. The first lever frame 36 also carries the left erector lens $c^2$. The prism itself is fixed by means of fine ground Portland cement into a nickel iron tray with a retaining groove around its inner edges, corresponding to a similar retaining groove in the prism (see Fig. 16). The tray is pivoted underneath the center of the reflecting side and is capable of being tilted and thus leveled by means of three pairs of antagonist screws and of being rotated slightly in a horizontal plane by means of other antagonist screws. The right hand prism $d'$ is similarly mounted in another nickel iron tray with similar adjustments, carried by a shelf forming part of the casting, while a prolongation of the same casting carries the right hand erector lens $c'$.

Both erector lenses are capable of longitudinal adjustment by screwing the cells carrying them to and fro in the flanges which hold them. This is for the purpose of getting the two images thrown into the left hand and right hand eyepieces to the same scale of magnification. The flanges carrying the two cells also should be provided with a slight adjustment upward and downward as well as a tilting adjustment by means of three pairs of antagonist screws, for squaring them on with respect to the eyepieces. The eyepieces themselves or rather the eye lenses thereof ($a'$, $b'$, and $a^2$, $b^2$, Fig. 1) are mounted upon two swivels pivoted at 33 and 34 each swivel carrying a high and a low power eye lens of powers 20 and 40 respectively. The left swivel 33 is pivoted upon the before-mentioned metal slide 24 for adjusting the distance between the two eyepieces in use.

Each swivel carries, as part of itself, two tubes within which the actual eye-lens tubes slide to and fro. These latter tubes are provided with three pins projecting through three straight slots parallel to the axis and cut in the pipes, into three spiral slots cut in and through an external sleeve or tube capable of rotation. Hence if the latter is rotated, then the eye-lens tubes and their lenses move in and out for focal accommodation and a flange on the external focusing sleeve should be provided with a scale of diopters engraved on it, from 0 for normal long sight down to —5 diopters for short sight $a+2$ diopters for long sight. The two eyepieces 31 and 32 can then always be set to the same focus or sight to suit any given observer.

Figure 7:
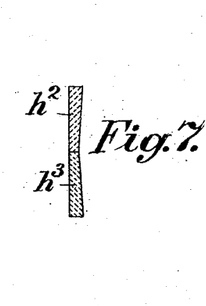
Fig. 7 shows in section a form of halving prism, the converse of that shown in Fig. 2.

The field lenses for both high and low powers are fixed immovably in the tube or casting carrying the eyepieces; but the left hand field lens is constructed in two parts so as to do duty for the halving prism $h^2$, $h^3$, before described and shown in Fig. 7. This construction is shown in Figs. 17 and 18 in vertical section and elevation. Each half is the thicker half of a lob-sided lens like that shown in Fig. 19, both surfaces being spherical. The formula for the excess of thickness of one side of each lens over the other is $$E = \frac{CD}{F(n-i)}$$

where E is the required difference of thickness, D is the diameter of the lens, $n$ is the refractive index of the glass, F is the effective distance from the center of the left erector lens $c^2$ to the back or eye-side of the left field lens, and C is the estimated distance from the center of the left erector lens $c^2$ (Fig. 14) to the center of either of the two semi-circles of light as projected from the center point of the halving lens or prism $h$ (Figs. 2 and 14) through the outlines of $r^2$ and $l^2$ (Fig. 16) on to the said erector lens. After two wedging lenses have thus been made and turned circular with their edges square to their first surfaces which face the erector lens, then each is cut in half, the thinner halves being rejected and the two thicker halves 40, after careful trimming down to exact semi-cicles with the cut edges forming about $$90 + \frac{.}{3}$$

degrees with the circular edge of the surface facing the erector lens, are then placed in their cell as shown in Fig. 17. It is essential that the diametral edges which come together on the eye side should be exceedingly sharp and free from minute chips, and also that a close but not quite perfect contact should take place between them in the eye-side, although there may be a larger and quite perceptible gap on the side facing the erector lens. For this reason a narrow strip of very fine black tissue paper should separate the edges on the eyeside, which prevents an actual contact, which would inevitably lead to a chipping of the edges.

Figure 15:
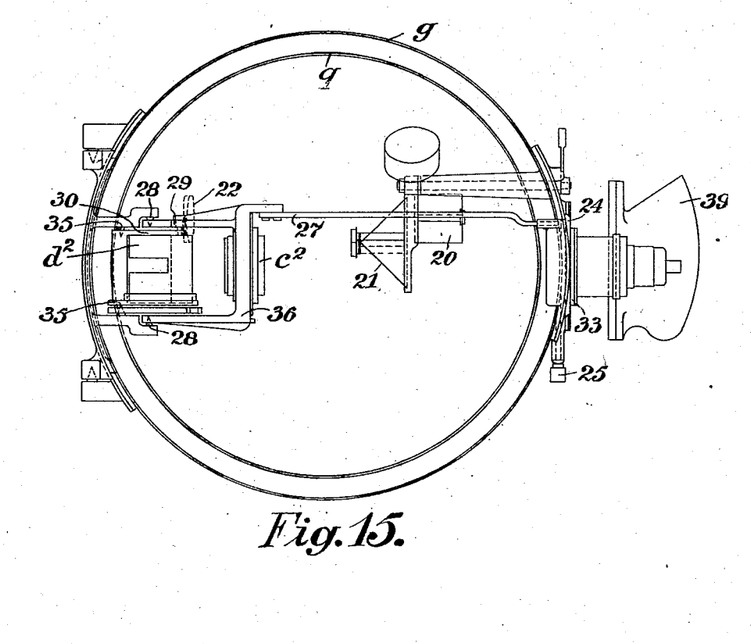
Fig. 15 shows a cross section at A—A, Fig. 14.
Figure 16:
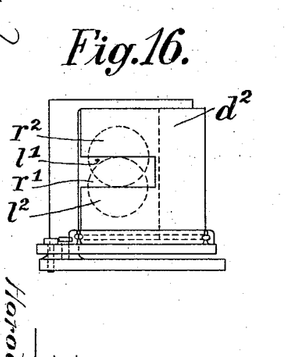

The right hand field lens is a thinner lens of nearly the same curves but of the usual simple form. The left hand erected image is formed exactly upon the horizontal junction of the two wedged half lenses 40 on the eye side, but the right hand erector image is formed in the air about a tenth-of-an-inch behind the side next to the eye, but both images are supposed to be at the same actual level with respect to the tube of the instrument and the eye lenses. In Figs. 14 and 15 is shown an india rubber forehead rest and eyeshade 39.

In Fig. 14 is shown the arrangement for actuating the halving adjustment of the instrument, whereby the images from the right end and left end of the instrument are adjusted to exactly the same height in the field of view. There is a knurled head at 42 which turns a grooved pulley 41 carrying a thin copper wire endless cord 44, whose other end goes over a grooved wheel 43 placed under the left optical square $s'$ shown in Fig. 11; this wheel 43 forms part of a right-hand screw of 40 threads per inch screwing into the floor of the box, and has threaded into its center a smaller caliber male right-handed screw of 50 threads per inch whose upper end is fixed to the optical square frame $s'$ in such manner that it (the screw) cannot rotate. Thus one turn of the wheel 43 will only raise or lower the optical square frame by $$1/40 - 1/50\text{th inch} = \frac{1}{200}\text{th}.$$

The optical square frame hinges upon two ball-headed pivots at 45 screwed into the floor of the box, on a line at right angles to the center line of the tube of the instrument. The ball-heads of these pivots 45 fit each into a female socket 46 which can be screwed stiffly up and down in the optical square frame. This is to facilitate the perfect leveling and adjustment of height of the optical square. Spiral springs (not shown) keep 46 up in contact with 45.

The leveling of the optical squares is of great importance. First the right hand box $t^2$ (detached from the tube) with its optical square $s^2$ fixed up in it, is set up and leveled upon a leveled plane plate and a couple of leveled pencil or ink marks or crosses are viewed, as reflected off the optical square, by means of a surveyor's telescopic level or theodolite and the optical square is tilted by means of its three attachment screws until the reflected images of the two leveled marks appear level with one another, and then the optical square is fixed.

After the whole instrument is put together the left hand optical square is leveled with respect to the right hand one. For this purpose the instrument is set up quite level and directed upon two black straight lines set up exactly parallel and vertical and at a distance apart equal to the base length and at the same distance from the instrument as the scale of ranges used for graduating. Then, as seen in the right hand eye-piece, the upper half of one of these black lines should appear exactly in alinement with the lower half of the same line. Both above and below the halving line the black line should appear as all one straight vertical line. If it does not and there is a bend or elbow at the halving line, it is proof that the left hand optical square is not level or upright like the right hand one and the error should be righted by operating the two female screw plugs 46 and the halving wheel 43, Fig. 11. The image in the left hand eyepiece should not be adjusted for equal magnification and uprightness until after the right hand eyepiece is correct.

With regard to the three mirrors $m'$, $m^2$, $m^3$, of course all three should be set perpendicular to their frame which should be provided with cheeks forming surfaces for squaring them from. After the frame is attached to the floor of the box the whole frame will want a little adjustment in order to secure that the optical axis of the telescope is reflected off so as to strike a point on the furthermost mirror of the right hand optical square that is central (in plan) on such mirror and level with the axis of the tubes. For this purpose a 2 inch aperture simple lens of about 15 feet focal length is held centrally in the front of the objective and a small black spot on a small piece of paper is gummed on to the surface of the said far mirror of the right hand optical square where the reflected axis of the telescope should strike it. Then the frame carrying the mirrors $m'$, $m^2$, $m^3$, should be adjusted by its three foot-screws until the image of the said spot falls into the center of the field of view of the right eyepiece. This may also necessitate a slight adjustment of one of the mirrors in its own fixings in azimuth. If this adjustment is not attended to, it may lead to the best illumination of the right hand lower view being thrown out of center of the field.

The most convenient method of effecting the zero or coincidence adjustment of the instrument is by means of a pulley 47, Fig. 14, alongside the halving adjustment pulley 41. This is best rotated by means of a special key inserted through a specially shaped aperture whereby any risk of the adjustment being played with is obviated. A copper wire endless cord 49 is stretched over this pulley, whose other end passes over the pulley 48 fixed to the end of the screw 50 for adjusting the zero prism $p'$, which is shown in Fig. 11. When the instrument has been sighted upon a convenient test object at a known distance or infinite distance and the range drum has been set exactly to that range, then if the two images as seen in the right hand eyepiece are not exactly coincident in the horizontal direction, they can be made so by operating the pulley 48 by means of the proper key. This swings the prism $p'$ around slightly about its vertical bearings at its left hand end.

The mechanism for actuating the swinging prism $p^2$ and translating its movements into ranges is shown in its essentials in Figs. 12 and 13. The frame of the prism $p^2$ swings about an axis 7, and a toothed sector 15 is fixed to the underside of the frame of the prism $p^2$ engaging into a pinion 16 fixed centrally on a stem 2 just above a worm wheel 3 thereon. The radii of the sector and the pinion are preferably arranged so that one complete rotation of the worm wheel and pinion will cause the swinging prism to swing through an angle of not less than 32 degrees, that is from the position of minimum deviation up to the position where the extra deviation will neutralize the parallax of an object 2000 yards away, which will generally be the minimum range the instrument is required to register. The worm wheel 3 should have ninety-six teeth engaging into a worm 17 having a double thread, so that forty-eight turns of the worm 17 will correspond to one turn of the worm wheel. The worm wheel is rotated by means of the rod or steel tube 4 which is actuated from the elevation handle $x$ shown on a small scale in Fig. 10, and also in Fig. 13. At the bottom of the elevation handle $x$ is a bracket 5 for the palm of the right hand to rest on, leaving the finger and thumb free to rotate the knurled drum 8 attached to a shaft 6 carried up to the miter wheel 9 engaging into another miter wheel 10 on the shaft 4. On the vertical shaft 6 is also a beveled pinion 12 gearing into a beveled wheel 13, attached to the range drum 14, on which is engraved the scale of ranges, in the form of a spiral of about ¼ inch pitch. The ratio between the pinion 12 and the wheel 13 is preferably 1 to 12, so that since the shaft 4 rotates forty-eight times for the worm wheel's once, therefore the drum 14 will go around four times for the whole scale of ranges from infinity down to 2000 yards. A spiral hollow groove cut in the surface of the drum is utilized for driving a reading mark up or down so as to follow the track of the spiral.

Figure 9:
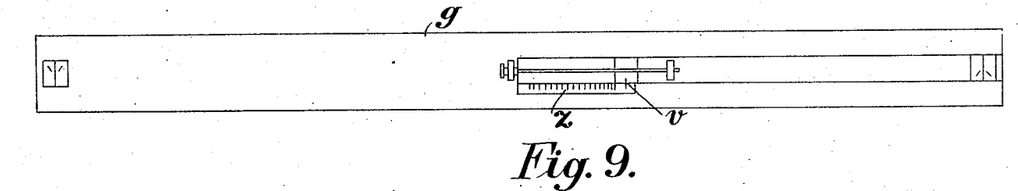
Fig. 9 illustrates the graduating board for graduating the instrument.

Fig. 9 shows roughly the form of graduating board $z$ that must be used. The two vertical black lines at the ends are supposed to be exactly the base length apart when the vernier mark $v$ is set to infinity, and this same vernier mark can be traversed by somebody at the board along the scale of marks whose distances ($d$) in inches from the infinity mark are given by the simple formula $$d = \frac{DB}{R}$$

wherein D is the distance of the range-finder from the graduating board (in inches), B is the base length in yards and R is the range (in yards) to which the required mark is to correspond. For D a convenient distance is 100 yards or 3600 inches and two collimator lenses of about 5½ inches apertures and 100 yards focal length must be provided for fixing opposite to the two windows of the instrument, at a distance between their centers equal to the base length. Thus as the vernier mark is traversed along the scale of ranges the right hand mark is carried nearer to the left hand or fixed mark, and as the left hand end of the instrument views the left hand mark and the right hand end the right hand mark, it is obvious that if the coincidence between the two images is to be preserved, then the swinging prism must be swung more and more from its position of minimum deviation until its extra deviation neutralizes the angular traverse of the right hand mark as viewed from the rangefinder. Therefore the procedure is this: first the graduating board is set to infinity, and the swinging prism also set to minimum deviation, after which the two images are brought to coincidence by operating the zero prism $p'$, Fig. 11, at the left hand end of the instrument. Then the graduating board operator sets the board to 20,000 yds. and the rangefinder operator turns the milled head 8, Figs. 10 and 13, until the two images are brought exactly into coincidence owing to the swinging of the range prism from its position of minimum deviation. When coincidence is obtained then the range drum 14 is marked off opposite the reading mark and so on until all the ranges have been gone through. After this there will be found a series of marks upon the range drum forming a spiral curve and the next procedure consists in properly engraving and numbering the marks and perhaps interpolating intermediate marks where required. Other drums can then be copied from the first one, provided the base length and angles of the swinging prism are kept constant.

The two right angled prisms shown at 20 and 21 in Figs. 14 and 15 are for the purpose of reflecting the light from the finder objective 22 into the right hand eyepiece and for this purpose they are mounted on a swivel so that after the object has been found and got into the middle of the field as seen by both right and left hand eyepiece, then the prisms are swung out of the way and then the right eye sees the rangefinder view.

At 18, Fig. 14, is shown an astigmatizer lens which is placed eighteen inches to the left of the halving prism. It consists of two plano-concave cylindrical lenses to 35 in. radius, the axes of the cylinders being horizontal. Each lens must have one edge (the junction edge) trimmed straight and parallel to the axis of the cylindrical surface and at a distance of .37 inch from the thinnest part of the lens. Then the two lenses are put together up to their junction edges on a temporary piece of plate glass and the whole trimmed to the required circular size (2.75 diameter) in the lathe, after which the two semi-circular lenses can be placed in their proper cell. This lens is thrown in and out of operation by means of turning the winged nut 23, Fig. 14, which, by means of the rod connection 19 throws over the lever attached to the cell of the astigmatizer.

The optical squares and their frames are preferably constructed in accordance with by British patent specifications Nos. 13562/1907, 20315/1908 and 7392/1910, and the mirrors $m'$, $m^2$, $m^3$, are likewise held (preferably) between ball screws and pallets as described in the last mentioned specification.

I will now give dimensions, radii of curvatures, thicknesses and positions for all the optical parts of the instrument, in inches, as well as specifications of the glasses required.

*Right hand optical square.* ($s^2$.)
Size of mirrors 6.20x3.50x.325 thick.

*Left hand optical square.* ($s'$.)
Size of mirrors 5.75x2.625x.325 thick.
Mirror $m'$, size 5.80 diam. circular x.325 thick.
Mirror $m^2$, size 5.80 " " x.325 thick.
Mirror $m^3$, size 6.90 " " x.325 thick.

All the above mirrors should be made of the most transparent silicate or borosilicate crown glass as well as the two parallel plane windows $w'$, $w^2$, which are respectively of 5.5 and 5.75 diameter and .325 thick. The zero prism $p'$ and the range prism $p^2$ are made of the same glasses and to the same angles. The angle between the surfaces of the crown prism is 1° 42′ 50″ and that of the flint prism is 48′ 50″. The glasses used are—, ($n_D$ being the refractive index for the sodium line:)

Borosilicate crown having $n_D$=1.5118 and dispersive power (C to F)=63.9.

Ordinary dense flint having $n_D$=1.617 and dispersive power=36.6.

The finished size of the two range prisms is 6.95 by 3.6 by .40 central thickness. The finished size of the two zero prisms is 5.50 by 2.75 by .40 central thickness.

The objective $o$ is of 5¼ diameter and 64 inches focal length and to the following radii of curvature. In every case I shall give the radii of the surfaces in the order in which the light passes through them:

$r_1$= +17.5, $r_2$= +18.75; $r_3$= −18.75, $r_4$= −65.
Central thickness=.55.   Central thickness=.20.

The crown lens is of silicate crown, having—$n_D$=1.518 and disp. power=60.2.

The flint lens is of Schotts' flint type 0.1266 having—$n_D$=1.6054 and disp. power=43.93.

The halving prism and halving lens is 2.05 diameter and the radii of the latter:

$r_1$=flat, $r_2$= −1.70, $r_3$= +1.70, $r_4$= +3.25.

The crown lens is of ordinary crown having $n_D$=1.516 and disp. power=58.7.

The concave flint lens is of Schotts' flint type 0.1266 having—$n_D$=1.6054 and disp. power=43.93.

The angle of slope for each side of the halving prism is 2° 18′.

The left hand erector lens is a triple combination:

$r_1$= +4.125, $r_2$= +7.5, $r_3$= −7.5, $r_4$= −1.5, $r_5$= +1.05, $r_6$= +3.53.

The first crown lens is of borosilicate crown having $n_D$=1.5165 and disp. power= 64.2.

The flint lens is of Schotts' type 0.1266 having—$n_D$=1.6054 and disp. power=43.93.

The 3rd crown lens is of ordinary crown having—$n_D$=1.5173 and disp. power=60.3.

The central thicknesses are respectively about—.20, .10 and .40 inch.

The right hand erector lens is also triple having—

$r_1$= +4.20, $r_2$= +8.375, $r_3$= −8.375, $r_4$= −1.67, $r_5$= +1.67, $r_6$= +4.40.

The glasses are similar respectively to those used for the left erector lens. The central thicknesses are respectively about .18, .10 and .23. The distance from back vertex of halving lens $h$ to the first surface of the left prism $d^2$ (Fig. 13) is about 9.8 in.

The left hand double wedged field lens is curved to radii $r_1$= +3.0, $r_2$= +2.75.

Finished diameter equals 1.40 and each half is first made complete to that diameter, but one edge .42 thick and the other .28 thick.

The right hand field lens is curved to radii $$r_1 = +3.6, r_2 = +2.75.$$

The glasses used for both field lenses are dense barium crown having $n_D = 1.6050$ and disp. power $= 58.2$.

The low power eye lenses are to the radii—

$$r_1 = +2.43, r_2 = +.50, r_3 = -.50, r_4 = +1.29.$$

Central thicknesses of lenses are .24 and .08. Finished diameters $= .75$.

The crown lenses are of light crown glass having—$n_D = 1.497$ and disp. power $= 64.9$.

The flint lenses are of light flint having—$n_D = 1.574$ and disp. power $= 41.6$.

The high power eye lenses are to the radii—

$$r_1 = +.6075, r_2 = +.445, r_3 = -.445, r_4 = +1.79.$$

Central thicknesses are .24 and .06. Finished diameters are .625.

The crown lenses are of silicate crown having—$n_D = 1.517$ and disp. power $= 58.2$.

The flint lenses are of dense flint having $n_D = 1.62$ and disp. power $= 36.2$. The two prisms $d^2$ and $d'$ (Figs. 13 and 14) for reflecting the light into the eyepiece are of any transparent borosilicate crown glass. The left hand prism $d^2$ should be of the following dimensions: Total height $= 1.75$, angle of reflecting surface $.45°$. Width parallel to main tube $= 1.04$. Breadth across main tube at front $= 1.60$.

The right hand prism $a'$ should be about 1.40 in. across the transmitting surfaces by 1.05 high. The slot cut through the left hand prism for the passage of the light to the other prism should be .385" to .390" high at the orifice facing the halving lens, tapering up to .42" about 1 inch farther back. The nearest distance between left erector lens and its field lens should be about 7.8 in. and that between right erector lens and its field lens about 9.0 inches.

The reflecting hypotenuses should be silvered, as it is a fact that total reflection never takes place unless the surfaces are kept scrupulously clean. While good silvering will reflect (by internal reflection) as much as 98¾ per cent. and that without the trouble of frequent cleaning, a somewhat dirty naked surface will only reflect internally about 92½ per cent. of the light.

Figures 20, 22, 23:
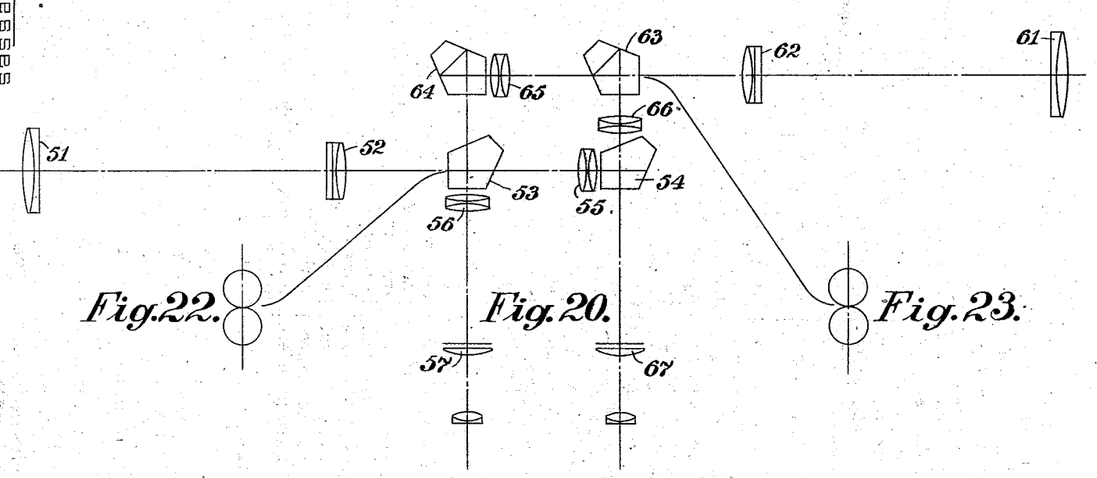
Fig. 20 is a plan, and Fig. 21, a front view showing diagrammatically a modified arrangement for an instrument having two objectives.
Figs. 22 and 23 are diagrams referred to in connection with Figs. 20 and 21.
Figure 21:
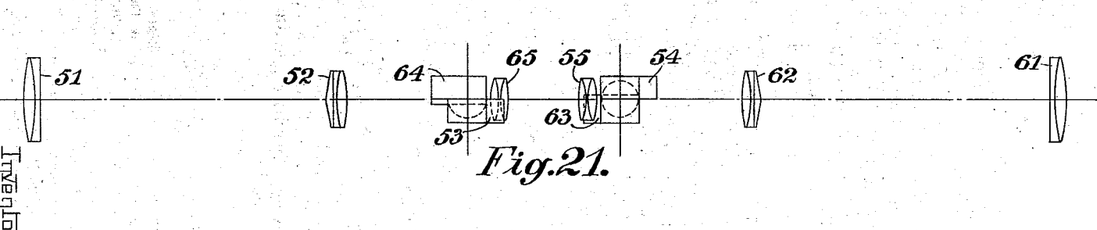

I will now describe in rough outline in connection with Figs. 20 to 23 a method of applying my invention to a rangefinder having two objectives. In the first place it does not appear possible to retain the two objectives in one straight line, so the line of one telescope must be behind but parallel to the other. The two objectives are shown at 51 and 61 while 52 and 62 are the two halving prisms and lenses. The images formed by the objectives and reflected into them by the two optical squares (not shown) fall upon the halving prisms, which latter cause the two pupilary images of the objective to be thrown onto the plane of the first surfaces of the small optical squares 53, 63, as indicated by Figs. 22 and 23, respectively, which are connected by curved lines to the surfaces of the corresponding optical squares. The light from the lower half of the right halving prism 62 goes through the upper image of the objective over the optical square 63 and is reflected off the optical square 64 into the left eyepiece where it is thrown by the erector lens 65 into the upper half of the field of view.

The light from the upper half of the right halving prism 62 goes through the lower image of the objective and is reflected off the optical square 63 into the right eyepiece where it is thrown by the erector lens 66 into the lower half of the field of view. The light from the lower half of the left halving prism 52 goes through the upper image of the objective over the top of the optical square 53 is reflected by 54 into the right eyepiece where it is thrown by the erector lens 55 into the upper half of the field of view. The light from the upper half of the left halving prism 52 goes through the lower image of the objective and is reflected off the optical square 53 into the left eyepiece where it is thrown by the erector lens 56 into the lower half of the field of view. Hence the two lower fields are truly stereoscopic and the two upper fields supplementary as in the previously described instrument.

The four erector lenses must be of such focal lengths and so placed as to give equal magnifications so that the whole apparatus requires very careful designing, and then the resulting instrument will not be so good as that previously described. The erector lens 56 will have to be semicircular, for all four erector lenses must have their centers level with the centers of the objectives. The erected images thrown by the erector lenses must be received upon the back edges of double wedged field lenses like that I have described and illustrated in Figs. 17 to 19. This is in order to refract the two pupilary images of the object glass into one and the same central position just behind the eye lenses, 57 and 67.

I declare that what I claim is:—

1. In a short base rangefinder, a pair of binocular eyepieces, means for producing in the upper and lower halves of one eyepiece views of the upper and lower parts of a distant object as seen from the right and left hand ends of the instrument, and for producing in the upper and lower halves of the second eyepiece views of the same parts of the object as seen from left and right ends respectively of the instrument, whereby if there is any unneutralized parallax it will show itself as a displacement of the upper image to the right of the lower image for the one eye and to the left of the lower image for the other eye, and whereby also the apparent separation or parallax is made to appear doubled when both eyes are binocularly focused upon either upper or lower images, in combination with means including a scale whereby any parallax can be removed and whereby the amount of adjustment required to remove the parallax can be read on the scale.

2. In a short base rangefinder, the combination of a pair of binocular eyepieces, means for producing in the lower half of the left and right eyepieces views of the bottom parts of a distant object as seen from the left and right ends respectively of the instrument, means for producing in the top halves of the left and right eyepieces views of the upper parts of the distant object as seen from the right and left ends of the instrument respectively, means for adjusting the position of the images in such a manner as to remove the parallax, and means for indicating the adjustment required.

3. In a short base rangefinder the combination of a pair of binocular eyepieces, means for receiving and transmitting views of the upper and lower parts of a distant object as seen from both the right and left ends of the instrument, means for partially superposing the pupilary images of the objective formed by light coming from opposite ends of the instrument, means for transmitting the images such that the two eyepieces receive in the lower parts thereof images from the right and left ends respectively of the instrument, and in the upper parts thereof images from the left and right ends respectively of the instrument, together with means for adjusting the position of the images as seen in the instrument whereby any unneutralized parallax can be removed, and means for indicating the adjustment required in order to remove the said parallax.

4. In a short base rangefinder, a pair of binocular eyepieces, means for receiving and transmitting views of a distant object as seen from opposite ends of the instrument, the said means including a swinging prism, mechanism for moving the same about an axis parallel to its refracting edge and for indicating the amount of movement on a scale, in combination with means for splitting up and separating the upper and lower partial images of a distant object as viewed from opposite ends of the instrument and means for combining into each eyepiece the upper portion of the image from one end of the instrument and the lower portion of the image from the other end of the instrument, the said upper and lower portions of the images being respectively from the left and right ends of the instrument in the one and from the right and left ends of the instrument in the other of the eyepieces.

5. In a short base rangefinder the combination of a pair of binocular eyepieces, means for receiving and transmitting images of a distant object as viewed from opposite ends of the instrument, said means including adjusting mechanism whereby the image as seen from one end can be caused to move for the purpose of eliminating any parallax, an object glass through one half of which the image from one end of the instrument passes and through the other half of which the image from the other end of the instrument passes, and means for splitting up and transmitting separately into the two eyepieces the upper and lower halves of the images as seen from opposite ends of the instrument.

6. In a short base rangefinder, the combination of means for receiving and transmitting images of a distant object as seen from opposite ends of the instrument, and for adjusting one of the images in such manner as to eliminate any parallax in the images as viewed, a slotted reflecting member and means for transmitting and erecting upper and lower half images of the object received thereon into the upper and lower halves of one of the eyepieces, and a second reflecting member adapted to receive the remaining half images which pass through the slot of the said slotted reflecting member together with means for transmitting and erecting the latter half images into the corresponding halves of the other eyepiece.

7. In a short base rangefinder, the combination of means for receiving and transmitting images of a distant object as seen from opposite ends of the instrument, and for adjusting one of the images in such a manner as to eliminate any parallax in the images as viewed, means for transmitting and erecting the upper half image from one end of the instrument and the lower half image from the other end of the instrument into the one eyepiece, separate means for transmitting and erecting the lower half image from the first end of the instrument and the upper half image from the second end of the instrument into the second eyepiece, and means for adjusting one of the eyepieces and the transmitting apparatus connected therewith simultaneously in the required ratios for the purpose of adjusting the separation of the eyepieces.

8. In a short base rangefinder, the combination of means for receiving and transmitting images of a distant object as seen from opposite ends of the instrument, and for adjusting one of the images in such a manner as to eliminate any parallax in the images as viewed, a reflecting surface and means for transmitting and erecting upper and lower half images from opposite ends of the instrument into one of the eyepieces, a second reflecting surface and means for transmitting lower and upper half images from corresponding opposite ends of the instrument into the other eyepiece, and means for adjusting the position of one of the eyepieces relatively to the other, adapted simultaneously to adjust, with half the amount of angular movement, the one of the reflecting members associated with the said moving eyepiece.

9. In a short base rangefinder, the combination of means for receiving and transmitting images of a distant object as seen from opposite ends of the instrument, and for adjusting one of the images in such a manner as to eliminate any parallax in the images as viewed, means for splitting up the upper and lower half images from the two ends of the instrument and directing them separately into the two eyepieces, a doubly-reflecting pair of prisms, an eccentrically placed finder objective, and means for swinging the said pair of prisms whereby the image from the said finder objective may be diverted when required into one of the eyepieces.

10. In a short base rangefinder, the combination with means for receiving and transmitting images as seen from opposite ends of the instrument of means for diverting the pupilary images of the objective formed by light from opposite ends of the instrument into two partially overlapping separate images, a slotted reflecting member for transmitting the upper and lower single portions of the pupilary images and a second reflecting member for transmitting the middle overlapping portions of the pupilary images, and a binocular eyepiece together with means for transmitting and erecting the images from the respective reflecting surfaces into the two parts of the eyepiece.

In witness whereof, I have hereunto signed my name this 28th day of February 1911, in the presence of two subscribing witnesses.

HAROLD DENNIS TAYLOR.

Witnesses:
L. E. BUCKLEY,
CHARLES E. TAYLOR.